United States Patent
Horikawa

[11] Patent Number: 5,439,023
[45] Date of Patent: Aug. 8, 1995

[54] SHUT-OFF VALVE FOR LIQUID FUEL
[75] Inventor: Kazuo Horikawa, Kooriyama, Japan
[73] Assignee: Kabushiki Kaisha Mikuni, Japan
[21] Appl. No.: 226,079
[22] Filed: Apr. 11, 1994
[51] Int. Cl.⁶ .............................................. F16K 17/36
[52] U.S. Cl. .................... 137/202; 137/43; 137/630.15
[58] Field of Search ............. 137/39, 43, 202, 587, 137/630.14, 630.15

[56] References Cited
U.S. PATENT DOCUMENTS

| | | | |
|---|---|---|---|
| 4,209,032 | 6/1980 | Drori | 137/202 |
| 4,753,262 | 6/1988 | Bergsma | 137/43 X |
| 4,886,089 | 12/1989 | Gabrlik | 137/202 |
| 4,982,757 | 1/1991 | Ohasi | 137/202 |
| 5,044,389 | 9/1991 | Gimby | 137/630.14 X |

Primary Examiner—Robert G. Nilson
Attorney, Agent, or Firm—Lorusso & Loud

[57] ABSTRACT

A shut-off valve for a liquid fuel includes a valve housing in which a float, adapted to bs raised by buoyant force as the liquid fuel flows into the valve housing, and a valve disc, for sealably closing a fuel vapor outflow hole, are arranged in such a manner as to allow the valve disc to be vertically displaceable relative to the float. A plate-like valve member, which carries a rod-shaped protuberance for sealably closing a through hole formed through the valve disc, is disposed between the valve disc and the float. When the float is lowered as the liquid fuel returns from the valve housing to the fuel tank, a first engagement pawl engages the plate-like valve member at a single point and, at the same time, a second engagement pawl engages a flange portion of the valve disc at a single point, whereby the plate-like valve member and the valve disc are opened so as to enable the fuel vapor generated in the fuel tank to flow into a receiving canister. At the time of an occurrence of vehicular accident or emergency, a ball member disposed in the valve housing is slidably displaced along a concave conical surface until the fuel vapor outflow hole is sealably closed by the valve disc via the ball member, thus preventing the liquid fuel from flowing into the canister.

7 Claims, 4 Drawing Sheets

SHUT-OFF VALVE FOR LIQUID FUEL

BACKGROUND OF THE INVENTION

1. Field of the Invention

The present invention relates generally to a shut-off valve for a liquid fuel, disposed in a fuel vapor path extending between the upper hollow space of a fuel tank for a vehicle and a canister for storably receiving the fuel vapor generated in the fuel tank. The shut-off valve serves to prevent the liquid fuel from flowing into the canister at the time of an occurrence of a vehicular accident or emergency such as abnormal inclination of the vehicle, abnormal turning movement or the like. More particularly, the present invention relates to improvement of a shut-off valve of the foregoing type.

2. Description of the Prior Art

To facilitate understanding of the present invention, two typical conventional shut-off valves of the foregoing type will be described below with reference to FIG. 6 and FIG. 7.

FIG. 6 shows a sectional elevational view of the structure of a conventional shut-off valve for a liquid fuel as disclosed in Japanese Patent laid-open Publication NO. 2-112658. In the drawing, reference numeral 1 designates a valve housing. A plurality of fuel vapor inflow holes 2 are formed through the bottom wall of the valve housing 1. The fuel vapor inflow holes 2 are open to the upper space of a fuel tank (not shown) located above the surface level of a liquid fuel in the fuel tank. Reference numeral 3 designates a fuel vapor outflow hole. The fuel vapor outflow hole 3 communicates with a canister (not shown) in which the fuel vapor generated in the fuel tank is storably received.

Reference numeral 4 designates a float, and reference numeral 6 designates a valve disc. When a liquid fuel from the fuel tank flows into the valve housing 1 through the fuel vapor inflow holes 2, due to abnormal inclination of a vehicle or abnormal turning movement, the float 4 is raised up by its buoyancy, causing a through hole 6 formed through the central part of the valve disc 5 to be sealably closed by the upper surface of the float 4 as shown in FIG. 6. Subsequently, the valve disc 5 is raised up until the upper surface of the valve disc 5 comes into sealing contact with the annular lower end edge of the top of the housing around the fuel vapor outflow hole 3, to thereby prevent any inflow of the liquid fuel into the canister through the fuel vapor outflow hole 3. When the vehicle is restored to the normal running state and the liquid fuel is returned from the valve housing 1 to the fuel tank through the fuel vapor inflow holes 2, the float 4 will be lowered and the force of gravity on the valve disc 5 and the float 4 will overcome the force urging the float 4 into sealable contact with the annular housing top around the through hole 6 of the valve plug 5, the latter force being the vapor pressure prevailing in the fuel tank. Thus, the float 6 downwardly separates from the through hole 6, resulting in the opening of the through hole 6 of the valve disc 5, whereby the fuel vapor pressure is reduced or relieved. In other words, the valve plug 5 separates from the fuel vapor outflow hole 3 by the force of gravity on the valve disc 5 itself. The valve disc 5 is further forced away from the fuel vapor outflow hole 6 by the force of gravity acting on the float 4 due to engagement of a flange 7 of the float 4 with an annular shoulder 8 of the valve disc 5. Once the valve disc 5 is parted away from the fuel vapor outflow hole 6, the fuel vapor generated in the fuel tank is introduced into the canister via the fuel vapor inflow holes 2 and the fuel vapor outflow hole 3. Incidentally, reference numeral 9 designates a coil spring which assists the valve closing function of the float 4. While the float 4 is immersed in the liquid fuel, the valve disc 5 is held in the closed state by the buoyant force of the float 4 and the resilient force of the coil spring 9. Even when the vehicle is inclined or it is turned upside down (through an angle of 180 degrees) due to a vehicular accident or emergency, the valve disc 5 is likewise held in the closed state due to a component of the gravity acting on the float 4, corresponding to the angle of inclination, and to the resilient force of the coil spring 9.

FIG. 7 shows a sectional elevational view of the structure of another conventional shut-off valve for a liquid fuel as disclosed in Japanese Utility Model Laid-Open Publication NO. 4-134733 filed by an inventor of the present invention. In the drawing, reference numeral 1 designates a valve housing, reference numeral 2 designates a plurality of fuel vapor inflow holes, reference numeral 3 designates a fuel vapor outflow hole, reference numeral 4 designates a float 4, reference numeral 5 designates a valve disc, and reference numeral 6 designates a through hole formed through the valve disc 5. The upper part of the valve disc 5 has a semispherical contour for a reliable, sealable contact with the annular area of the housing defining the lower end of the fuel vapor outflow hole 3. In addition, the upper end of a rod-shaped protuberance 42, integrated with a main body 41 of the float 4, likewise has a semispherical contour for reliably sealing the lower end of the through hole 6. With this construction, even in the case that the valve disc 5 or the float 4 is brought into sealing contact with the lower end of the fuel vapor outflow hole 3 or the through hole 5, while inclined relative to the fuel vapor outflow hole 3 or the through hole 6 for some reason, liquid fuel shut-off can be reliably achieved. In addition, engagement of the float 4 with the valve disc 5 during downward displacement of the float 4 is attained by engagement of a plurality of engagement pawls 43 formed inside of a float casing 41 with a flange portion 51 formed around the outer periphery of the valve disc 5 at the lower end of the latter.

Reference numeral 11 designates a plurality of guide ribs formed around the inner wall surface of the valve housing 1, and reference numeral 12 designates a flange portion formed on the exterior of the valve housing 1. That portion of the valve housing 1 located below the flange portion 12 is normally located within a fuel tank (not shown).

As is apparent from the above description, each of the aforementioned conventional liquid fuel shut-off valves is constructed such that the valve disc 5 is displaceable relative to the float 4. In order to prevent the valve disc 5 from failing to be lowered by gravity acting on both the valve disc 5 and the float 4, resulting in the fuel vapor outflow hole 3 remaining closed by the valve disc 5 when the liquid fuel has been returned from the valve housing 1 to the fuel tank, the valve disc 5 is received separately from the float 4 in the valve housing 1 so as to enable the valve disc 5 to be vertically displaced relative to the float 4. Further, the through hole 6 is formed with a diameter smaller than that of the fuel vapor outflow hole 3, so that the intensity of force of the float 4 against the valve disc 5 produced by the fuel vapor pressure in the fuel tank is smaller than that of the force of the valve disc 5 against the annular lower end edge of the fuel vapor outflow hole 3 produced by the fuel vapor pressure via the float 4. With such construction, the valve disc 5 is opened in two steps when the liquid fuel returns from the valve housing 1 to the fuel tank. However, to assure that the upper surface of the float 4 can reliably separate from the lower end of the through hole 6 (in the case as shown in FIG. 6) or the semispherical upper part of the rod-shaped protuberance 42 can reliably separate from the lower end of the through hole 6 (in the case as shown in FIG. 7), it is unavoidably required that the weight of float 4 be in excess of a predetermined value. Thus, it is practically difficult to design and construct the float 4 with smaller dimensions and thus it is practically difficult to design and construct the shut-off valve itself with smaller dimensions.

SUMMARY OF THE INVENTION

The present invention has been made in consideration of the aforementioned background.

An object of the present invention is to provide a shutoff valve for a liquid fuel wherein the shut-off valve assures that at the time of an occurrence of accident or emergency such as abnormal inclination of a vehicle, abnormal turning movement or the like, inflow of the liquid fuel into the canister can be reliably prevented.

Another object of the present invention is to provide a shut-off valve for a liquid fuel wherein the shut-off valve assures that as long as the vehicle runs normally, the fuel vapor generated in a fuel tank is permitted to flow into the canister through a plurality of fuel vapor inflow holes and a fuel vapor outflow hole, each formed in a valve housing.

The present invention provides a shut-off valve for a liquid fuel disposed in a fuel vapor path which connects the upper space in a vehicle fuel tank with a canister for storably receiving the fuel vapor generated in the fuel tank, so as to prevent the liquid fuel in the fuel tank from flowing into the canister in an accident or emergency involving abnormal inclination of the vehicle, abnormal turning movement or the like. The shut-off valve of the present invention includes a valve housing, a float, adapted to be raised by buoyant force as the liquid fuel flows into the valve housing having a plurality of fuel vapor inflow holes and a fuel vapor outflow hole, and a valve disc for sealably closing the fuel vapor outflow hole when the float is fully raised. A through hole, having a diameter smaller than that of the fuel vapor outflow hole, is formed through the center portion of the valve disc, the valve disc being vertically displaceable relative to the float. When the liquid fuel flows into the valve housing, the float and the valve disc are raised up together to sealably close the fuel vapor outflow path with the valve disc, and when the liquid fuel which has once entered the valve housing returns to the fuel tank through the fuel vapor inflow holes, the valve disc separates from the lower end of the through hole as the float is lowered. Engaging means, for bringing the valve disc into engagement with the float after the through hole of the valve disc is opened, are formed on the float. Further, the present invention provides the improvement of the additional provision of a plate-like valve member, adapted to sealably close the lower end of the through hole of the valve disc as the float is raised by buoyancy, is disposed between the valve disc and the float. When the float drops as the liquid fuel which has once entered the valve housing returns to the fuel tank, the first and second engaging means are brought into contact with the plate-like valve member and the valve disc, respectively, each at a point of contact located on its outer periphery. Upon on completion of the foregoing engagement, the force of gravity on the float is applied to the plate-like valve member and the valve disc as a couple of forces by leverage. Thus, the force of gravity is utilized as a valve opening force.

To prevent the liquid fuel from flowing into the canister at the time of an accident or emergency involving abnormal inclination of the vehicle, abnormal turning movement or the like, a ball member and a cooperating concave conical surface are provided so that the ball member is displaced along the concave conical surface, between the float casing and the bottom wall of the valve housing, responsive to the abnormal inclination.

A coil spring received in a cavity in the casing of the float may be utilized to bring the valve disc and the plate-shaped valve member into position to close both the fuel vapor outflow hole of the valve housing and the through hole of the valve disc, instead of the combination of the ball member and the concave conical surface.

It is desirable that the plate-like valve member is molded of a high molecular weight elastomeric material.

In addition, it is desirable that a semispherical protuberance be centrally formed on the plate-shaped valve member for sealable contact with the through hole of the valve disc.

The float is composed of a float casing and a guide member fitted around the outer peripheral surface of the float casing for guiding the movement of the valve disc, and a plurality of upright standing guide pieces are molded integral with the guide member.

To assure that the valve disc is limited in its movement relative to the float in the valve casing, a first engagement pawl for engaging a flange portion of the valve disc is formed on one of the guide pieces at its distal end to serve as one engagement means, and a second engagement pawl adapted for engaging the outer periphery of the plate-like valve member is formed on the same one guide piece near its lower end (base) to likewise serve as engagement means.

According to the present invention, the weight of the float required for separating the plate-like valve member away from the lower end of the through hole of the valve disc and for moving the valve disc away from the lower end of the fuel vapor outflow hole can be substantially reduced, by reliance on leverage with points on the outer periphery of the plate-like valve member and the valve disc, located opposite the first and second engagement pawls of the guide member, serving as fulcrums. This leverage makes it possible to reduce the volume of the float and to design and construct the shut-off valve itself with smaller dimensions.

In addition, since a high molecular weight elastomer material is employed as the material of the plate-like valve member, separation of the plate-like valve member from the valve disc can be easily achieved owing to partial separation of the plate-like valve member from the valve disc due to deflection of the plate-like valve member at the time of initial engagement of the plate-like valve member with the float.

Other objects, features and advantages of the present invention will become apparent from a reading of the following description in conjunction with the accompanying drawings.

BRIEF DESCRIPTION OF THE DRAWINGS

The present invention is illustrated in the following drawings in which.

DESCRIPTION OF THE PREFERRED EMBODIMENTS

The present invention will now be described in detail hereinafter with reference to the accompanying drawings which illustrate several preferred embodiments.

Figure 1:
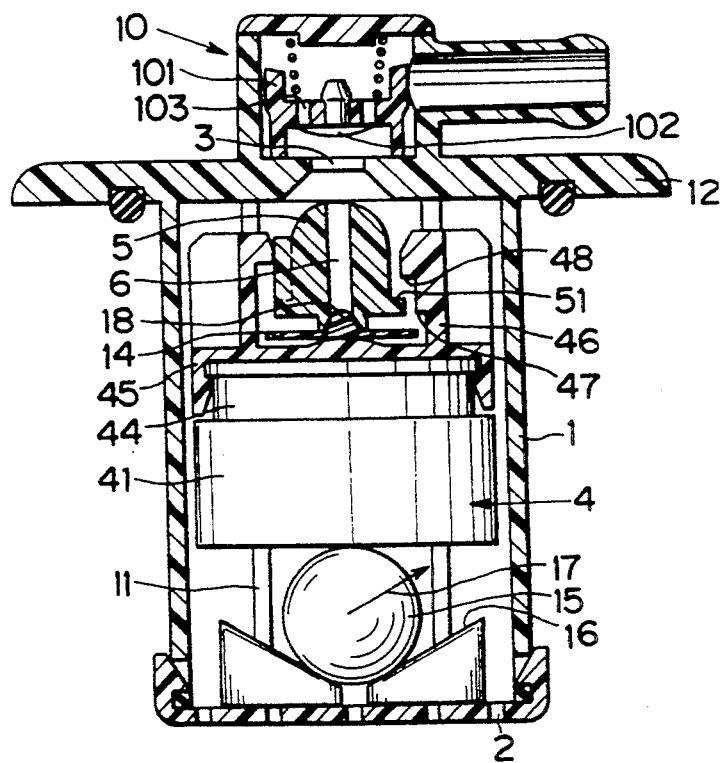
FIG. 1 is an elevational view, in cross-section, of a shut-off valve for a liquid fuel, constructed according to an embodiment of the present invention, wherein a liquid fuel shut-off valve and a two-way valve are integrated.

First, a shut-off valve for a liquid fuel, constructed according to an embodiment of the present invention, will be described below with reference to FIG. 1 to FIG. 3. In the drawings, reference numeral 1 designates a valve housing, reference numeral 2 designates a plurality of fuel vapor inflow holes, reference numeral 3 designates a fuel vapor outflow hole, reference numeral 4 designates a float, reference numeral 5 designates a valve disc, reference numeral 6 designates a through hole formed through the valve disc 5, reference numeral 11 designates a plurality of guide ribs formed around the inner wall surface of the valve housing 1 for guiding vertical displacement of the float 4, and reference numeral 12 designates a flange portion formed around the outer peripheral surface of the valve casing 1. FIG. 1 shows the state where no liquid fuel is present in the valve housing 1. At the time, since the valve disc 5 is separated from the lower end of the fuel vapor outflow hole 3, the fuel vapor generated in the fuel tank flows through the fuel vapor inflow holes 2, then through the annular space defined between the outer peripheral surface of the float 4 and the inner wall surface of the valve casing 1, and finally, out of the shut-off valve through the fuel vapor outflow hole 3 to a canister in which it is storably received. Reference numeral 10 designates a two-way valve. When the pressure of the fuel vapor increases due to a rise in the temperature prevailing in the fuel tank, valve disc 101 of the two-way valve 10 is raised up to open the latter, causing the fuel vapor to quickly flow toward the canister. On the contrary, when the fuel vapor pressure is reduced due to reduction of the temperature in the fuel tank, an inverted umbrella-like valve 102 is opened, causing air to slowly flow into the valve housing 1 through a plurality of through holes 103 via the canister.

Since the two-way valve 10 does not form any part of the present invention, description on the two-way valve 10 will be omitted for the purpose of simplification.

Referring to FIG. 1, the float 4 is composed of a float casing 41 and a guide member 45 fitted around the outer peripheral surface of the float casing 41 for guiding the movement of the valve disc 5. The guide member 45 is engaged with an annular groove 44 formed around the outer peripheral surface of the float casing 41. Reference numeral 14 designates a plate-like valve member which is disposed between the valve disc 5 and an upper surface of the guide member 45. A semispherical protuberance 18 is centrally formed on the upper surface of the plate-like valve member 14 and serves to sealably close the lower end of the through hole 6 of the valve disc 5. Usually, the plate-like valve member 14 is molded of a high molecular weight flexible material, e.g., a rubber or the like, which makes it easy for the valve disc 5 to separate from the lower end of the through hole 6. A plurality of upright standing guide pieces 46 are molded integral with the guide member 45, and a first engagement pawl 48, adapted to engage a flange portion 51 radially extending from the valve disc 5, is formed on one of the guide pieces 46. In addition, a second engagement pawl 47, adapted to engage the outer periphery of the plate-like valve member 14, is likewise formed on the foregoing one of the guide pieces 46. It should be noted that operative connection of the float 4 to the guide member 45 is not limited to that depicted in the drawing figures. Alternatively, the float 4 may be fixed to the guide member 45 to form an integral structure using an adhesive. Reference numeral 15 designates a ball member which normally rests on a concave conical seating surface 16. When the vehicle is sidewards turned for some reason, the ball member 15 is displaced along the seating surface 16 as indicated by arrow 17 in order to raise up the float 4 until the fuel vapor outflow hole 3 is sealably closed by the valve disc 5.

Figure 2:
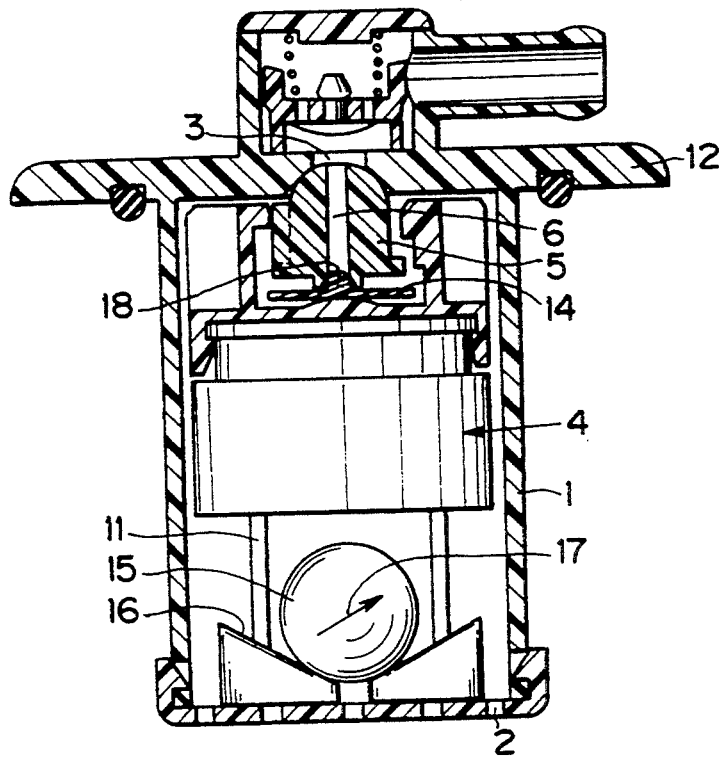
FIG. 2 is an elevational view, in cross-section, of the shut-off valve shown in FIG. 1, showing the state wherein liquid fuel has entered into the valve housing of the shut-off valve.

FIG. 2 shows the state where the float 4 is raised up due to inflow of the liquid fuel through the fuel vapor inflow holes 2 at the time of an occurrence of a vehicular accident or emergency involving inclination of the vehicle, abnormal turning movement of the vehicle or the like. The lifting of the float 4 causes the valve disc 5 to be elevated via the plate-like valve member 14 which serves to sealably close the lower end of the through hole 6 of the valve disc 5 therewith, whereby outflow of the liquid fuel through the fuel vapor outflow hole 3 is prevented. Also at this time, when the vehicle is tilted sidewards for some reason, the ball member 15 is displaced along the concave conical seating surface 16 in the direction indicated by arrow 17, causing the float 4 to be raised up to assume the state shown in FIG. 2. As a result, outflow of the liquid fuel is likewise prevented in the same manner as the preceding case.

Figure 3:
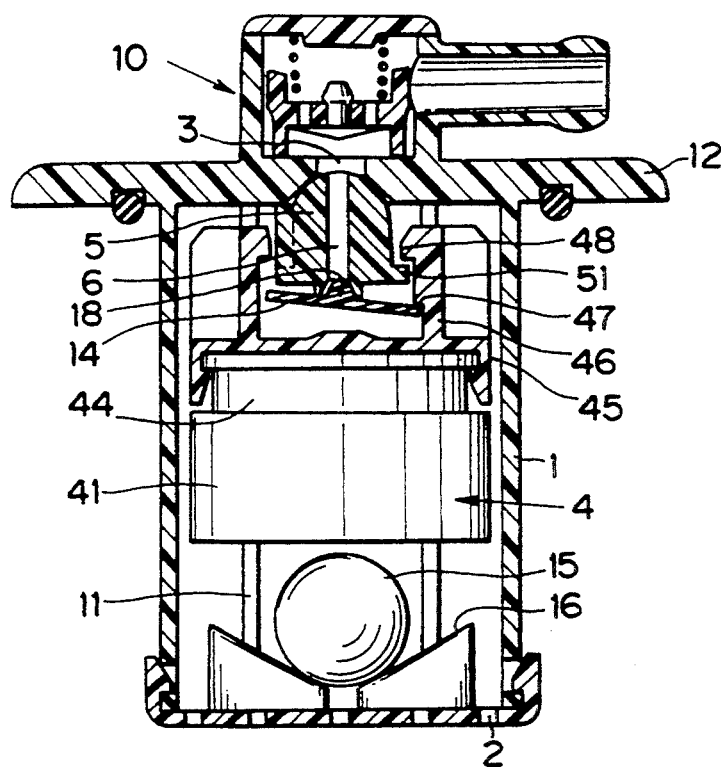
FIG. 3 is an elevational view, in cross-section, of the shut-off valve shown in FIG. 1, showing initiation of return of liquid fuel from the valve housing to a fuel tank, wherein the valve disc has started to part from the lower end of a fuel vapor outflow hole.
Figure 6:
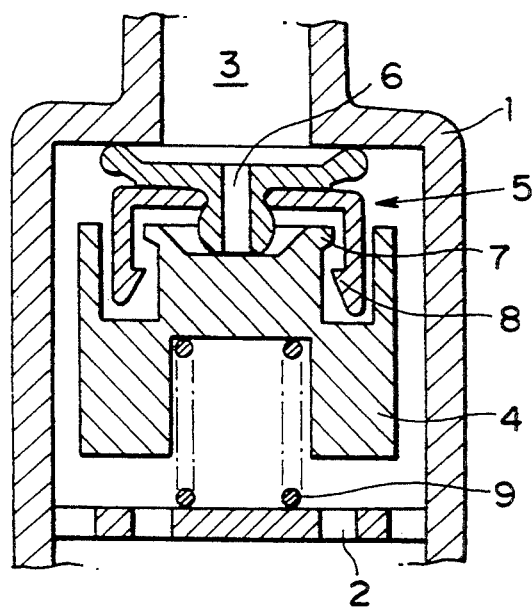
FIG. 6 is an elevational view of a conventional shut-off valve for a liquid fuel.
Figure 7:
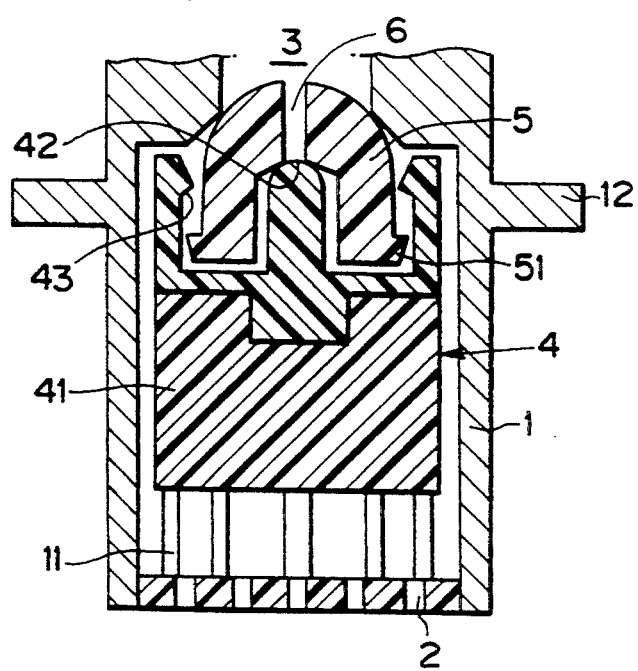
FIG. 7 is an elevational view, in cross-section, of another conventional shut-off valve for a liquid fuel.

FIG. 3 shows the state where the liquid fuel which has entered the valve casing 1 returns to the fuel tank through the liquid fuel inflow holes 2. In this state the second engagement pawl 47 engages the plate-like valve member 14, causing the latter to start to separate from the lower end of the through hole 6 of the valve disc 5 by inclination of the plate-like valve member 14. In the embodiment, since an annular valve seat protrudes from the lower surface of valve disc 5, around the through hole 6, the force which serves to separate the plate-like valve member 14 from the lower end of the through hole 6 of the valve disc 5 is several times as large as the gravitational force on the float 4 owing to the lever function of the plate-like valve member 14 about a projection serving as a fulcrum. Generally, if the fuel vapor pressure in the valve casing 1 is equal to that in the fuel tank, it is possible to reduce the pressure of the fuel vapor in the valve housing 1 by moving the plate-like valve member 14 away from the annular valve seat at the lower end of the through hole 6 of the valve disc 5 by the force of gravity on the float 4 of a smaller size than that of the conventional shut-off valve. Also in the case that no annular valve seat is formed on the valve disc 5, the force required to separate the plate-like valve member 14 from the lower end of the through hole 6 of the valve disc 5 is substantially increased to as large as two times the force of gravity on the float 4, owing to the lever function of the plate-like valve member 14 with a point on the outer periphery of the valve disc 5, located opposite the second engagement pawl serving as a fulcrum. Consequently, it is possible to use a float 4 having a size smaller than that of each of the conventional shut-off valves shown in FIG. 6 and FIG. 7.

As the float 4 is lowered, the first engagement pawl 48 engages the flange portion 51 of the valve disc 5, causing the gravitational force on the float 4 to be applied to the plate-like valve member 14 by the second engagement pawl 47, with a point on the outer periphery of the valve disc 5 located opposite the first engagement pawl 48 serving as a fulcrum for the lever function. Thus, the gravitational force on the float 4 can be effectively utilized as a valve opening force, effective for opening the valve disc 5.

Figure 4:
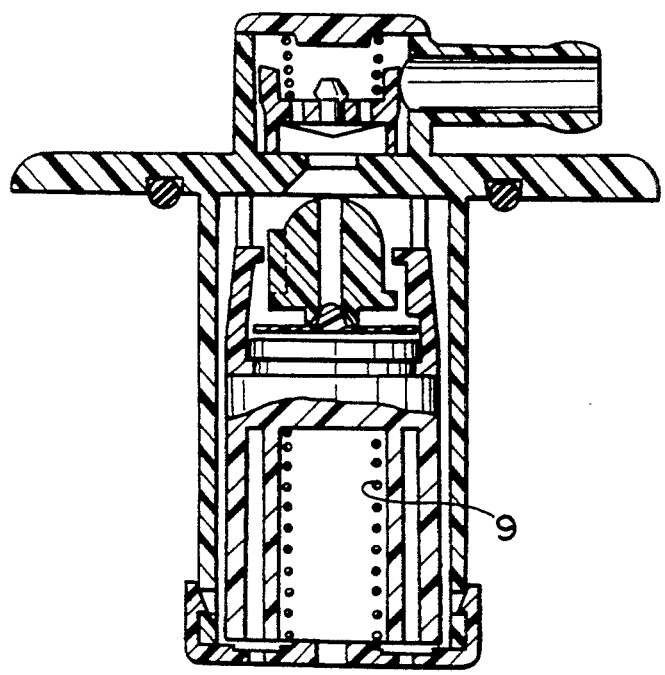
FIG. 4 is an elevational view, in cross-section, of a shut-off valve for a liquid fuel, constructed according to another embodiment of the present invention wherein a liquid fuel shut-off valve unit and a two-way valve are integrated, and a coil spring is provided between the float and the bottom wall of the valve housing.

Next, a shut-off valve for a liquid fuel constructed according to another embodiment of the present invention will be described below with reference to FIG. 4 and FIG. 5. As is apparent from FIG. 4, in this embodiment, a coil spring 9 is substituted for the combination of the ball member 15 and the concave conical sealing surface 16 of the preceding embodiment. When the liquid fuel flows into valve housing 1, causing float 4 to become immersed, a fuel vapor outflow hole 3 is sealably closed with a valve disc 5 by the buoyant force of the float 4 and the resilient force of the coil spring 9.

Figure 5:
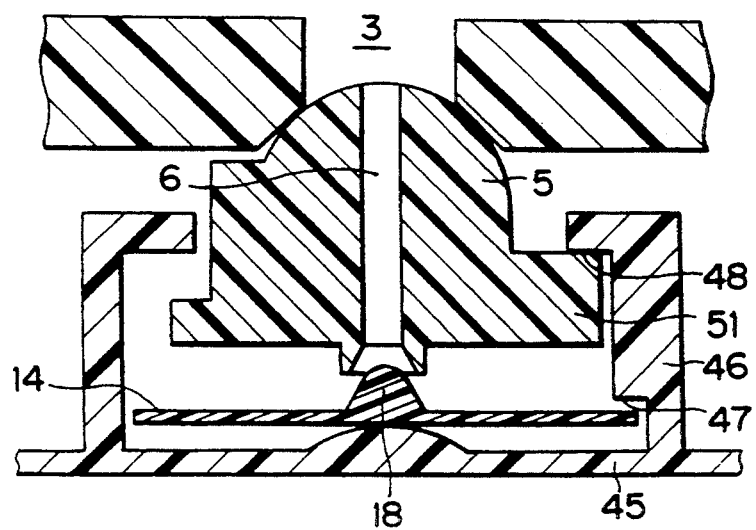
FIG. 5 is a fragmentary enlarged elevational view of the shut-off valve shown in FIG. 4, particularly showing the relationship between the valve disc, guide member for guiding displacement of the valve disc and a plate-like valve member disposed between the valve disc and the guide member.

FIG. 5 shows the relationship between guide member 45, adapted to engage with a flange portion 51 of the valve disc 5 for guiding the displacement of the valve disc 5, and plate-like valve member 14. Those components identical to components of the preceding embodiment are designated by the same reference numerals. Thus, description on these components will be omitted for the purpose of simplification.

While the present invention has been described above with respect to two preferred embodiments thereof, it should of course be under too that the present invention is not limited to only these embodiments, but various changes and modifications may be made without departure from the scope of the present invention as defined by the appended claims.

I claim:

1. A shut-off valve, for preventing liquid fuel from entering a vapor flow path providing communication between the vapor space of a fuel tank in a vehicle and a vapor storage canister, said shut-off valve closing the vapor flow path responsive to an abnormal inclination of the vehicle and comprising:

a valve housing having at least one fuel vapor inflow hole and a fuel vapor outflow hole;

a float, slidably contained within said valve housing, for rising within said valve housing by buoyant force upon liquid fuel entering said valve housing;

a valve disc, for sealably closing said fuel vapor outflow hole upon being forced upward by said float, said valve disc having a central through-hole;

a plate-like valve member for engaging said valve disc, in a closed position, to close a lower end of said through hole, responsive to rising of said float;

pivot means, carried by said plate-like valve member, for allowing said plate-like valve member to pivot relative to said valve disc while in said closed position;

first engagement means, carried by said float, for engaging said valve disc, responsive to lowering of said float, to limit movement of said valve disc relative to said float, said first engagement means serving to pull said valve disc away from said fuel vapor outflow hole responsive to the lowering of said float; and second engagement means for engaging a first single point on the periphery of said plate-like valve member, responsive to the lowering of said float, to pivot said plate-like valve member, about said pivot means, into contact with said valve disc at a second single point on the periphery of said plate-like valve member, opposite said first single point, thereby producing a force couple to disengage said plate-like valve member from said closed position by a levering action.

2. The shut-off valve as claimed in claim 1, additionally comprising a ball member and a member having a concave conical seating surface on which said ball member moves responsive to inclination of the vehicle, said ball member contacting a bottom wall of said float casing to raise and lower said float with said movement of said ball member along said heating surface.

3. The shut-off valve as claimed in claim 1, additionally comprising spring means, received in a cavity in said float, for urging said float upward, thereby urging said plate-like valve member to said closed position and said valve disc into a position sealably closing said fuel vapor outflow hole, responsive to occurrence of a vehicular accident or emergency such as abnormal inclination of said vehicle, abnormal turning movement of the latter or the like.

4. The shut-off valve as claimed in claim 1, wherein said plate-like valve member is molded of a high molecular weight elastomeric material.

5. The shut-off valve as claimed in claim 4, wherein said plate-like valve member has a semispherical protuberance which mates with said through-hole of said valve disc to close said through-hole.

6. The shut-off valve as claimed in claim 1, wherein said float comprises a float casing and a guide member fitted around the outer periphery of said float casing for guiding the movement of said valve disc, said guide member including a plurality of upright-standing guide pieces.

7. The shut-off valve as claimed in claim 6, wherein said first engagement means is a first pawl formed adjacent a distal end of one of said guide pieces, wherein said valve disc has a flange portion which is engaged by said first pawl, and wherein said second engagement means is a second pawl which engages the outer periphery of said plate-like valve member and is formed on said one guide piece.

* * * * *